No. 865,917. PATENTED SEPT. 10, 1907.
W. & H. KUEHNLEIN.
CULINARY UTENSIL.
APPLICATION FILED SEPT. 8, 1906.

Inventors
William Kuehnlein,
Harry Kuehnlein,
By Victor J. Evans
Attorney

Witnesses
Geo. Ackman Jr.
L. B. Areilhé

UNITED STATES PATENT OFFICE.

WILLIAM KUEHNLEIN AND HARRY KUEHNLEIN, OF PHILADELPHIA, PENNSYLVANIA.

CULINARY UTENSIL.

No. 865,917.

Specification of Letters Patent.

Patented Sept. 10, 1907.

Application filed September 8, 1906. Serial No. 333,818.

*To all whom it may concern:*

Be it known that we, WILLIAM KUEHNLEIN and HARRY KUEHNLEIN, citizens of the United States, residing at Philadelphia, in the county of Philadelphia and State of Pennsylvania, have invented new and useful Improvements in Culinary Utensils, of which the following is a specification.

The invention relates to an improved culinary utensil, comprehending specifically a tool constructed of a single piece of material in the use of which cooking utensils may be readily and conveniently handled under all conditions.

The main object of the present invention is the provision of a tool of the character described in which the cooking utensil is securely held against possibility of slipping, the construction providing for the convenient and ready use of the implement in connection with cooking utensils of varying forms and sizes.

The invention will be described in the following specification, reference being had particularly to the accompanying drawings, in which:—

Figure 1:
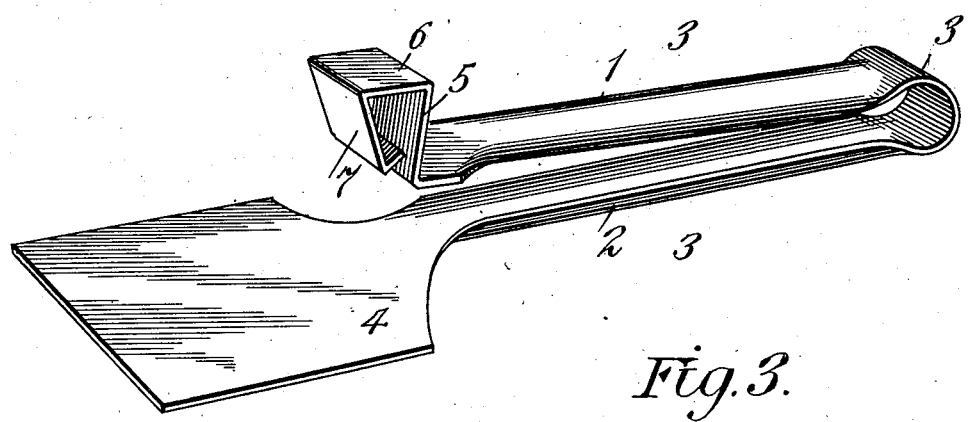
Figure 3:
Figure 2:
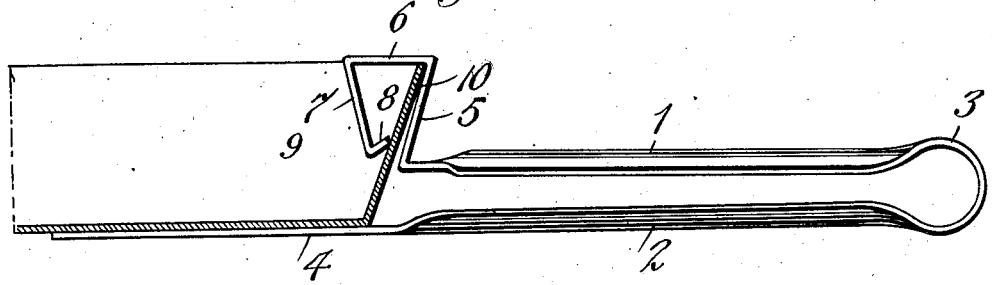

Figure 1 is a perspective view of the implement constructed in accordance with my invention, Fig. 2 is an elevation of the same shown in coöperative relation to a cooking utensil, the latter being shown in section, Fig. 3 is a sectional view illustrating the transverse sectional contour of the handle portion of the improved tool.

Referring to the drawings it is to be noted that my improved tool is constructed of a single strip of material comprising upper and lower handle portions 1 and 2, connected at their relatively rear ends by a spring bend 3. The forward end of the lower handle member is materially increased in width to provide a plane blade or plate 4, hereinafter termed the lifting plate, and designed in use to be inserted beneath the cooking utensil to be lifted. The relatively forward end of the upper handle member is bent upwardly at a slight rearward inclination, as at 5, thence forwardly, as at 6, in parallel relation to the plane of the handle member, and then downwardly, as at 7, at a slight rearward inclination, the lower end of the portion 7 being bent upwardly and inwardly to provide a clamping lip 8. The portions 5 and 7 of the clamping member formed at the forward end of the handle portion 1 incline toward each other, as shown, the relative degree of inclination and the length of the clamping lip 8 being such that when the parts of said clamping member are in normal position the free edge of the lip 8 will practically contact with the relatively forward portion of the surface 5. The material of which the implement is composed is of an inherent resilient nature to provide for the separation of the portions 5 and 7 of the clamping member when engaging said member with the edge of the cooking utensil, as will presently appear. The handle portions 1 and 2 are preferably of concavo-convex form in cross section, as shown in Fig. 3, the opposing surfaces of the respective handle portions being reversely curved to provide for a rounded gripping surface throughout the length of the handle portions. The spring 3 is so tensioned as to normally separate the blade member 4 and the clamping member a distance in excess of the height of the usual cooking implement, thereby necessitating the pressure upon the handle portions to cause a coöperative engagement of the implement with the utensil.

In use the plate member 4 is inserted beneath the bottom of the utensil 9 and pressure exerted upon the handle portions 1 and 2 to force the clamping member into engagement with the upwardly projecting rim 10 of said utensil, said edge entering the clamping member between the relatively forward surface of the portion 5 of said member and the free end of the lip 8. The clamping member is forced onto the rim of the utensil until the relatively lower surface of the portion 6 of said member contacts with the upper edge of the rim, said movement of the clamping member separating the portions 5 and 7 thereof to a sufficient degree to permit entrance of said rim. The spring character of the portion 7 with the clamping member will, therefore, bind the clamping lip 7 against the relatively inner surface of the rim of the utensil, thereby insuring a firm grip of the clamping member upon said rim. With the implement applied as described the utensil may be readily elevated and handled to any extent desired without the necessity of the user coming in direct contact with the utensil.

While preferring that the implement be constructed integrally of a single length of material, and that such material be light metal, it is obvious that so far as the details of the invention are concerned such construction or material is not important, and the implement may be constructed in one or more parts of any desired material.

Having thus described the invention what is claimed as new, is:—

A pan lifter constructed of a single length of material and bent to provide duplicate handle portions, a blade member projected in alinement with and beyond one terminal of one of the handle portions, and a clamp member formed integral with the end of the other handle portion, said clamp member comprising spaced walls extending at reverse inclines from the plane of the handle member and connected at their upper end by a wall extended in parallel relation to the handle member, the relatively lower edge of one of the walls being free of connection with the handle member and provided with a lip of materially less length than any of said walls and projected toward the remaining wall, said lip being arranged at an upward inclination relative to all of said walls, the free edge of the lip being normally in contact with the adjacent wall near the relatively lower end of the latter.

In testimony whereof, we affix our signatures in presence of two witnesses.

WILLIAM KUEHNLEIN.
HARRY KUEHNLEIN.

Witnesses:
JAMES BURNS,
JOHN F. SMITH.